May 12, 1925.
W. DUBILIER
ELECTRICAL CONDENSER
Filed Jan. 31, 1924
1,537,660
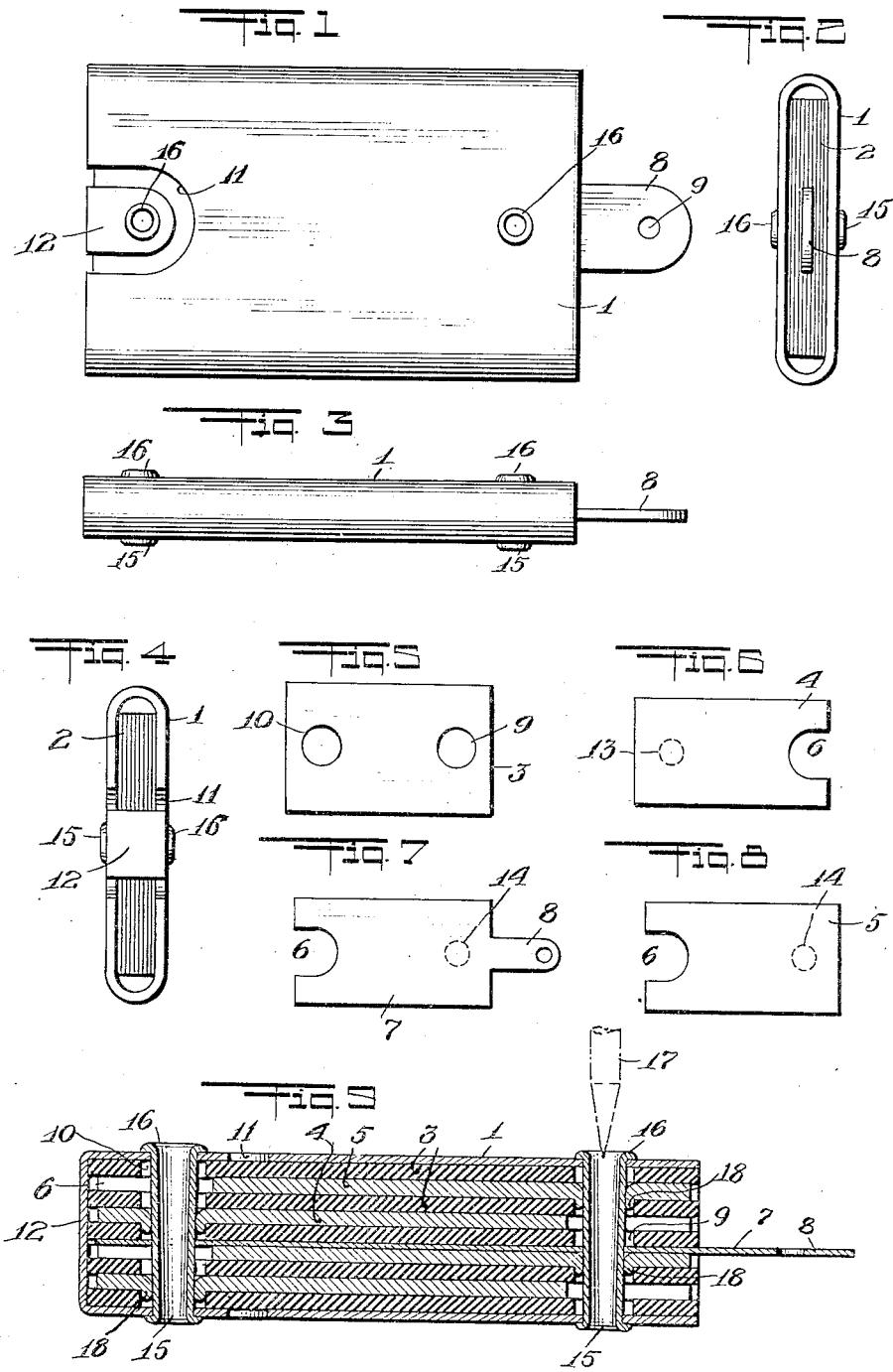
INVENTOR
WILLIAM DUBILIER
BY
H. R. Van Deventer
HIS ATTORNEY Patented May 12, 1925.

1,537,660

UNITED STATES PATENT OFFICE.

WILLIAM DUBILIER, OF NEW YORK, N. Y., ASSIGNOR TO DUBILIER CONDENSER AND RADIO CORPORATION, A CORPORATION OF DELAWARE.

ELECTRICAL CONDENSER.

Application filed January 31, 1924. Serial No. 689,754.

*To all whom it may concern:*

Be it known that I, WILLIAM DUBILIER, a citizen of the United States, residing at New York city, in the county of New York and State of New York, have invented certain new and useful Improvements in Electrical Condensers, of which the following is a specification.

This invention relates to improvements in electrical condensers for use in radio and other electrical apparatus.

An object of my invention is to provide a condenser that can be made up in convenient form and that will be of efficient construction and design, with a protective casing which will effectually prevent all breakage and injury that might otherwise occur.

A further object of my invention is to provide a condenser in which the electrical connections between the conductive elements and the parts which are directly connected to the terminals of the circuit in which the condenser is placed, can very advantageously be secured by the manner in which the condenser is assembled and finished.

These and other objects of my invention will appear from the description which follows, taken with the accompanying drawings, in which the best form of my invention now known to me is illustrated. This disclosure, however, is not to be construed as limiting me to the exact details which are shown and mentioned herein; as I may resort to variations not necessarily illustrated, but embraced within the principle of my invention, as indicated by the terms of the appended claims.

On the drawings, Fig. 1 is a top view of a condenser according to my invention.

Fig. 2 is an end view seen from the right in Fig. 1.

Fig. 3 is a side view.

Fig. 4 is an end view seen from the left in Fig. 1.

Fig. 5 shows one of the dielectric sheets of the condenser, on a smaller scale.

Fig. 6 shows one of the conductive sheets, also on a smaller scale.

Fig. 7 shows a plan view of a part similar to one of the conductive elements, through which connection to an outside circuit can be made; also reduced.

Fig. 8 shows a conductive element similar to that shown in Fig. 6, but to be of opposite polarity when built in the condenser, likewise on a reduced scale.

Fig. 9 is a section on the line 9—9 of Fig. 1, on an enlarged scale.

The condenser comprises an outside cover or casing 1, which can be provided by taking a section of tubing and flattening it by pressure. Into this casing is inserted the body or stack of the condenser 2. The stack is made up of sheets of a suitable dielectric such as mica 3, and alternating sheets of conducting material such as tinfoil indicated at 4 and 5. Each of the sheets of tinfoil may have a recess 6 at one end. In assembling the stack, a piece of mica 3 may first be taken, and on this mica can be laid a piece of foil 4, so that with the mica in the position shown in Fig. 5, the sheet of foil 4 will have the recess 6 in the end thereof, at the right. Another piece of mica is laid on top of the sheet 4 and then a piece of foil 5 is placed on top of the second sheet of mica, with the recess 6 in the end thereof, at the left. In this way the stack can be built up to comprise as many layers as needed. If desired, on top of one of the layers of foil, I may place directly and in contact with same a terminal element, which may be in the form of a copper plate 7, having a recess 6 to register with the recess 6 in the sheet, and at its opposite end a perforated projection 8, which will extend out beyond the end of the casing 1. The condenser is shown in Fig. 9 for purposes of illustration only, as consisting of two plates 4 and two plates 5, all separated by layers of mica 3, and it will be noted that all of the mica sheets may have large apertures 9 and 10 at each end. The width of these apertures may be as great as the width of each recess 6, and each recess 6 of the sheets 4 will overlie and approximately register with the apertures 9, while each recess 6 of the plates 5 will overlie and approximately register with the apertures 10.

Connection with the outside circuit can be made for the condenser by joining the plates 5 to one terminal and the plates 4 to another. For this purpose the casing 1 has a recess 11 at one extremity, exposing a considerable portion of the upper and lower face of the stack 2, and to this part of the stack is fitted a clip 12. The recess 11 will be deep enough to receive the clip without permitting contact between the edges thereof and the edges of the recess 11, while allowing the two arms of the clip to extend inward beyond the line of the holes 10. A hole is then punched through the two arms of the clip and the adjacent ends of the sheets 4. In making this hole, the tool is caused to move in line with the axis of the holes 10, to make an aperture indicated in Fig. 6 at 13. Similarly, at the opposite end of the casing 1, a hole will be punched along the axis of the holes 9 to pierce the sheets 5 as indicated in Fig. 8, by the numeral 14. The holes 13 and 14 will of course not be as wide as the recesses 6 or the holes 9 and 10, and rivets 15 can then be passed through the clip 12 to join only the sheets 4 to this clip, and through the opposite end of the casing 1 to join together the sheets of foil 5, and connect only the sheets 5 with the casing 1. These rivets are indicated at 15, and they may be tubular in form and secured in place by heading over their extremities against the opposite faces of the casing 1, and the clip 12, as indicated at 16. The rivet 15, passing through the clip, will not make contact with the sheets 5 because of the width of the recesses 6 therein, but will connect only with the sheets 4; and similarly, the rivet passing through the opposite end of the condenser will not make contact with the elements 4 because of the width of the recesses 6 therein, but will only make contact with the elements 5. Therefore, if binding screws be passed through these rivets, (serving as means for providing terminals for the condenser), and secured by nuts, the binding screws can serve for connecting the two sets of sheets of foil 4 and 5 to the opposite terminals of an electrical circuit. If desired, the projection 8 can be employed as one terminal of the condenser, and if so, the sheet of copper foil 7 can be punched through the same as the particular sheet of foil upon which it is placed.

It is desirable in assembling this condenser, and particularly in the step of inserting and fastening the rivets 15, to proceed in a manner by which an efficient contact between these rivets and the conductive elements of the condenser will be secured. To such end, when the assembled sheets of foil 4 and 5 with the sheets of mica between them, and the terminal sheet 7 included if desired, are slipped into the casing 1, the holes for the rivets 15 are made with a punch having a conical point indicated at 17 in Fig. 9. In passing through the end of the condenser bearing the clip 12, this conical point, in piercing the apertures 13 in the plates 4, will carry down with it the edges of these apertures, which will be successively smaller, turning them over to a slight extent to make a rim or burr 18. Likewise, in passing through the opposite end of the condenser, the punch 17 will produce the same effect in forming the holes 14 in the plates 5. The rivets 15 will also be tapered to some extent, and as the rivet at the right, for instance, is passed through the holes provided in the opposite faces of the casing 1, and in through the bore left by the punch 17, through the holes 9, the recesses 6 of the plates 4, and the holes 14 of the sheets 5, this rivet will come tighter and tighter into contact with the rims 18 of the openings 14 of the sheets of foil 5, and give a very efficient electrical connection. If the sheet of copper is present, it may also make in the same way a very good contact with the hole 14 through this sheet at the end bearing the projection 8. Likewise, the rivet at the other end will make very efficient contact with the rims of the apertures 13 through the sheets of foil 4, and unite these with the clip 12, and when the condenser is connected to the electrical circuit, a perfect electrical union of the plates of opposite polarity, to the terminals of the circuit, can be obtained.

The condenser stack can, of course, be impregnated with wax to fill all air spaces, and after it is inserted into the casing 1 it can be subjected to sufficient pressure by further flattening the casing to make this casing hold the mica and foil in tight engagement over the whole area of their surfaces. The manner in which the tube is flattened to make it tight about the stack 1, or the manner in which the wax is employed to fill all spaces inside the stack, or the order in which these steps are performed, is not material to this invention and, therefore, no full description thereof need be here given.

The casing 1 constitutes a protective cover for the stack of the condenser 2 and it also serves as a clamp for holding the foil and mica sheets together, the clamp extending over one face of the stack and across the edges or sides thereof upon the opposite face to engage the opposite face also.

It is preferable to have the holes 9 and 10 formed in the sheets of mica 3, before the mica is inserted in the casing 1; and while the sheets 4, 5 and 7 can be punched after they are placed in the casing 1, they may also be punched before insertion; the holes 13 and 14 then being made small enough to allow the punch 17 to turn over the rims 18, after the sheets 3, 4, 5 and 7 are inserted in the casing, as will be understood.

The mica sheets 3 are of course a little wider and longer than the sheets 4, 5 and 7.

Having described my invention, what I believe to be new and desire to secure and protect by Letters Patent of the United States is:—

1. A condenser comprising a stack, a flattened tubular casing enclosing the stack, the stack comprising conductive elements, the casing having a recess at one end, a clip secured to the stack and located within said recess, said clip being connected to part of said conductive elements, and a terminal for the remainder of the conductive elements.

2. A condenser comprising an open ended casing, a stack in said casing, a clip attached to one end of the stack and separated from said casing, means for connecting the clip to a part of said conducting elements to provide a terminal, and means for connecting the casing to the remainder of said conducting elements to provide another terminal.

3. A condenser comprising an open ended tubular casing, a stack therein, and consisting of conducting elements insulated from one another, the casing having a recess at one end, a clip engaging the stack and extending into the recess but spaced from the casing, a rivet passing through the clip and stack and making electrical contact with part of said elements, and a rivet passing through the casing and making contact with the remainder of said elements.

4. A condenser comprising conductive elements separated by a dielectric, said elements having apertures provided with rims or burrs, and a tapering member passing through said apertures and making electrical contact with the rims thereof.

5. A condenser comprising conductive elements separated by a dielectric, the conductive elements having apertures provided with rims or burrs, the apertures being of successively smaller size, and a tapered tubular rivet passing through said apertures and engaging the rims thereof to make electrical contact with said elements.

6. A condenser comprising conductive elements separated by a dielectric, said elements having apertures provided with rims or burrs, and a member passing through said apertures and making electrical contact with the rims thereof.

7. A condenser comprising a stack of elements of electrically conductive material separated by insulation, a clamp for holding the parts of the stack together, the clamp engaging one face of the condenser and extending across the opposite edges thereof into engagement with the opposite face, said clamp having a recess in its edge at one end, a terminal connected to part of said elements adjacent said recess, and a terminal at the opposite end of the condenser connected to the remainder of said elements.

8. A condenser comprising a stack containing elements of electrically conductive material separated by insulation; a clamp for holding the parts of the stack together, said clamp engaging one face of the condenser and extending across the opposite edges thereof upon the opposite face, the clamp having a recess in its edge adjacent one end, an eyelet rivet passing through the stack within said recess, and in electrical connection with part of the conductive elements, and a terminal at the opposite end of the condenser connected with the remainder of said elements.

In testimony whereof I affix my signature.

WILLIAM DUBILIER.